(12) United States Patent
Janus et al.

(10) Patent No.: US 6,385,381 B1
(45) Date of Patent: May 7, 2002

(54) FIBER OPTIC INTERCONNECTION COMBINATION CLOSURE

(75) Inventors: Neal Anthony Janus, Parsippany; Anthony Pellegrino, Gladstone; Randy Alan Reagan, Morris Plains, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/401,166

(22) Filed: Sep. 21, 1999

(51) Int. Cl.[7] .................................................. G02B 6/00
(52) U.S. Cl. ........................................ 385/135; 385/147
(58) Field of Search ................................ 385/135, 137, 385/147

(56) References Cited

U.S. PATENT DOCUMENTS 5,647,045 A * 7/1997 Robinson et al. ............ 385/135
5,781,686 A * 7/1998 Robinson et al. ............ 385/135

\* cited by examiner

*Primary Examiner*—Loha Ben
(74) *Attorney, Agent, or Firm*—Gibbons, Del Deo, Dolan, Griffinger & Vecchione

(57) ABSTRACT

A fiber optic interconnection combination closure is provided for fashioning optical fiber connections in an enclosed chamber protected from environmental conditions and fiber stress. Fiber splices are fashioned in splice organizers within a closure base assembly. Fiber terminations are fashioned at termination adapters arrayed in a closure chassis. Bend limits for optical fiber are maintained as the fiber is directed on paths in the closure to/from splice organizers, termination adapters, and closure exit portals. Fiber is organized, strain relieved and collected by fiber clips, rings, retainers, and looms positioned such that directed fiber is maintain at a minimum bend radius on such fiber paths. Provided slack storage facilities allow fiber connections to be handled individually without disturbing other connections and/or fibers. Fibers are retained, organized and guided in a path on the closure exterior by attached wire brackets. In this manner, optical signal degradation and/or total loss is avoided by limiting the bending of routed optical fiber to radii in excess of a predetermined minimum bend radius.

27 Claims, 9 Drawing Sheets

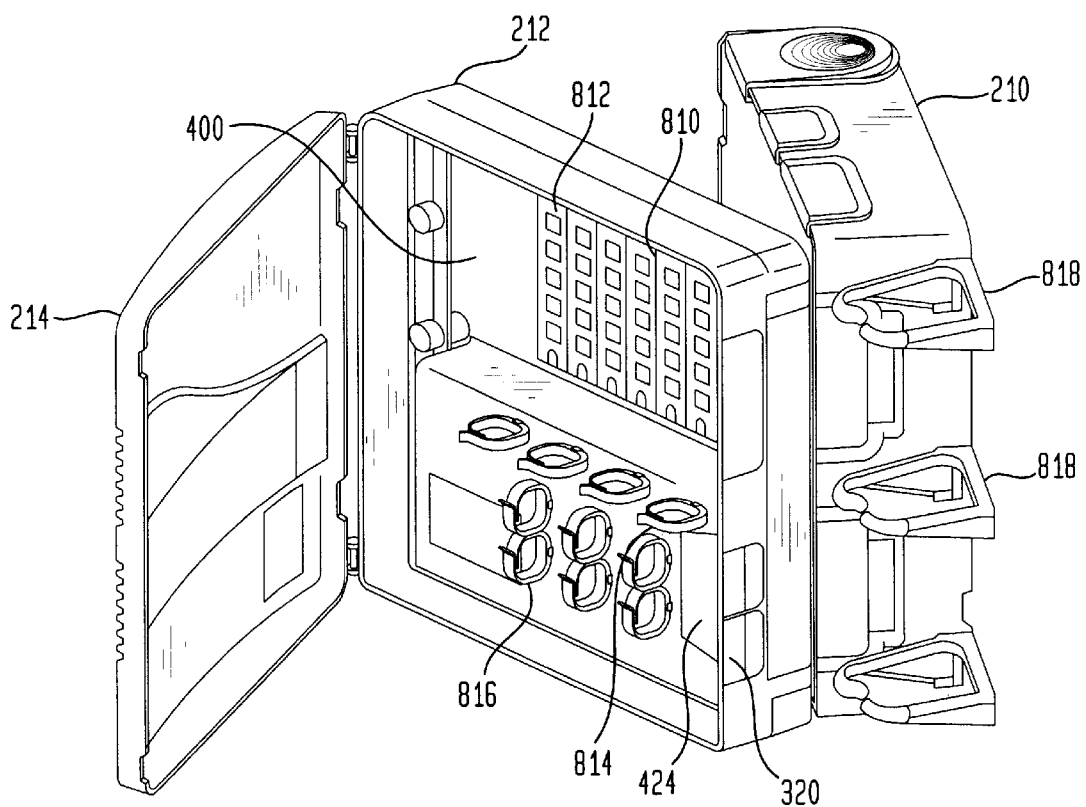

FIBER OPTIC INTERCONNECTION COMBINATION CLOSURE

CROSS REFERENCE TO RELATED APPLICATIONS

This application is related to the following:

U.S. patent application Ser. No. 09/399,885, entitled Portal Bend Limiter/Strain Reliever For Fiber Optic Closure Exit Portal, filed Sep. 21, 1999, now U.S. Pat. No. 6,321,017;

U.S. patent application Ser. No. 09/399,869, entitled Optical Fiber Bend Limiter For Optical Fiber Routing System, filed Sep. 21, 1999, now abandoned;

U.S. patent application Ser. No. 09/400,597, entitled Fiber Optic Interconnection Closure, filed Sep. 21, 1999, now abandoned; and U.S. patent application Ser. No. 09/401,169, entitled Panel/Tray For Fiber Optic Interconnection Closure, filed Sep. 21, 1999;

All of the above listed patent applications are assigned to Lucent Technologies, the assignee herein. All are herein incorporated into this disclosure by reference.

FIELD OF THE INVENTION

The invention relates generally to fiber optic cable routing systems and more specifically to assemblies for routing optical fiber without violating the minimum bend radius for the fiber.

BACKGROUND OF THE INVENTION

Optical communications refer to the medium and the technology associated with the transmission of information as light pulses. Many applications utilize an optical fiber network to establish optical communications between network locations. In order to enable optical communication and the flow of optical signals between network locations, various interconnections must be established between different optical fibers.

Optical fiber cable consists of a plurality of optical fibers surrounded by protective sheath. Each individual optical fiber ("fiber") consists of a small diameter core of low-loss material such as glass or plastic surrounded by a protective cladding that has a slightly lower index of refraction than the core. Light, as it passes from a medium of higher index of refraction to one of lower index of refraction, is bent away from the normal to the interface between the two media. At a critical angle of incidence, transmitted light is totally reflected within the medium having the higher index of refraction. Building on these basic rules of physics, optical fibers are designed and made such that there is essentially total reflection of light as it propagates through an optical fiber core. Thus, the core is able to guide light pulses with small attenuation of transmitted light pulses and low signal loss.

In many cases of signal transmission via optical media, a key transmission parameter is signal loss per distance transmitted. Due to the sensitive nature of the core of an optical fiber, there is a need to protect an optical fiber from external sources of stress, such as bending, pressure and strain, that increase signal loss. For example, an optical fiber should not be bent sharply anywhere along its path. If an optical fiber is bent past a critical angle, portions of transmitted light pulses will not be reflected within the core of the optical fiber and will no longer traverse the optical fiber. These attenuated portions of light pulses result in signal loss and thus, degradation of signal quality. Moreover, excess stress on an optical fiber may result in breakage of the fiber resulting in a total signal loss.

Referring to FIG. 1a, there is shown a simple ray model of light pulse transmission on a straight optical fiber. The optical fiber 100, shown in longitudinal cross section, has an optical core 102 which is surrounded by a cladding 104 and has a critical angle $\theta_c$. FIG. 1b shows a simple ray model of light pulse transmission on a bent optical fiber. As illustrated, when the bend of the optical fiber 100 is such as to cause a light ray to strike the boundary of the core 102 and cladding 104 at an angle greater than the critical angle $\theta_c$—the angular excess, as shown in the inset, being labeled $\theta_{bend}$—the light ray leaks out of the optical fiber core. Further, while lower order mode light rays are not likely to leak out of the optical fiber core, they may be transformed into higher order mode light rays and may leak out at a subsequent bend in the optical fiber. Accordingly, it is necessary that an optical fiber be routed so that bends in the optical fiber are of a sufficient radius to substantially avoid occurrence of such extra critical angle, and the associated light leakage.

The minimum bend radius characterizes the radius below which an optical fiber should not be bent to avoid light ray leakage. Typically, the minimum bend radius varies with fiber design. Bending an optical fiber with a radius smaller than the minimum bend radius may result in increased signal attenuation and/or a broken optical fiber.

Ordinarily, a unique optical fiber routing will be required to transmit light pulses between network locations. Over this unique route, light pulses may be propagated across several different optical fibers. At each transition from one fiber to another, individual optical fibers may be joined together by a splice connection or a connector adapter, thereby enabling light pulses to be carried from/between a first fiber and a second fiber. Once made, a connection must be held securely in place to prevent a loss of transmission quality. Transmission via optical fiber also requires repeating (i.e., amplifying) the transmitted optical signal at distance intervals. Consequently, optical fiber connections also must be made at the distance intervals where such signal repeater equipment is needed.

It may be necessary to bend optical fibers around comers and other obstacles in order to route the optical fiber to/from optical fiber network equipment and accomplish the required connections. While performing such activity, stresses on the optical fiber must be limited. Moreover, connections of optical fibers need to be isolated and protected from environmental degradation, strain, and torque in order to maintain the proper alignment between connected optical fibers and to avoid undesirable signal attenuation.

Previously, closures have been designed to protect connections of copper wire. A closure typically houses a cable interconnect frame and provides mounting surfaces for electronics and apertures for cabling to pass to/from the enclosed space of the closure. A door is usually provided for access to the enclosed interconnect frame and electronics compartment. However, optical fiber closures present a host of different complexities revolving around bend limiting and the minimum bend radius as described above.

Existing closure architecture does not always integrate placed optical fibers well with regard to the maintenance of the minimum bend radius for the fibers. Further, such closures provide no or limited means to control, organize, or stow optical fibers and fiber slack routed inside the closure. For instance, fibers may not physically fit well into a closure or may be jostled upon opening or closing of the closure. Additionally, excess lengths of fiber may not be compatible with the typically constrained storage area available within a closure. Consequently, special care is required in order to open and close the closure without exceeding the bend limit of or breaking optical fibers contained therein, which action could cause a system malfunction. Thus, a technician faces many logistical problems during maintenance of optical fibers within such a closure, adding significant complexity and time to that required to remove, repair and/or replace fibers in a closure.

SUMMARY OF THE INVENTION

Accordingly, it is an objective of the invention to provide a space efficient fiber interconnection closure for managing and protecting optical fibers that are terminated and/or spliced at various locations in an optical fiber network. It is also an objective of the invention to provide a closure that maintains the bend limit for fibers routed to termination points within the closure during its opening and closing. It is an additional objective of the invention to provide a slack storage area for optical fibers terminated in the closure. It is a further objective of the invention to provide an area within the closure for storage of excess lengths of optical fiber so as to enable the removal and re-entry of splice organizers from the closure during system maintenance. As a still further objective, the closure also should provide easy access to fiber connections and fiber slack while making accommodations to protect against excessive bending of optical fibers.

To that end, a modular fiber optic interconnection closure is described that maintains bend limits for optical fibers spliced and/or terminated in a protected space. A combination closure according to the invention is comprised of three articulated segments—a base assembly, a chassis, and a cover plate, which couple to form an enclosed space in which fibers are routed and connected. The closure arrangement is established to ensure that routed fibers are maintained at bend radii greater than their inherent minimum bend radius, thereby limiting stress on the fibers as well as avoiding light leakage due to excessive bend angles.

Mounting positions for splice organizers, which nominally house optical fiber splices, are provided in the base assembly. Mounting positions for optical adapters/ connectors ("termination adapters"), which nominally terminate optical fibers, are provided on two-plane panel in the chassis. Fibers are routed to/from these mounted fiber connection devices through a series of fiber-slack storage-devices. Fiber clips, fiber rings and fiber retainers are arranged to retain and organize fibers directed to/from the fiber connection devices and exit portals of the closure. The fiber clips, rings and retainers are positioned in the closure interior to assure that fiber bends are no smaller than a predetermined minimum bend radius while gathering, organizing and strain-relieving fibers. A vertical raceway along the exterior of the closure directs routed fibers to other optical network equipment. The closure maintains bend limits when opened to allow full access to the splices and termination adapters, thereby enabling quick and convenient fiber installation and service. Fiber slack may be manipulated and thus an individual fiber's connections may be accessed, while secured inside the closure, without disturbing other fiber connections. The particular splice organizers and/or termination adapters mounted in the closure may be specified to suit individual applications. The closure of the invention allows fiber connections to be fashioned and protected from environmental conditions and fiber stress.

BRIEF DESCRIPTION OF THE DRAWINGS

For a better understanding of the present invention, reference is made to the following description of an exemplary embodiment thereof, considered in conjunction with the accompanying drawings, in which:

FIG. 8a provides a front perspective of the panel of the invention installed in a chassis segment of a combination closure;

In the detailed description below, like reference numerals are used to describe the same, similar or corresponding elements in FIGS. 1–7b.

DETAILED DESCRIPTION OF THE DRAWINGS

There is described herein, illustrative and descriptive forms and embodiments of a fiber optic interconnection combination closure according to the invention. As would be apparent to those skilled in the art, various changes using different configurations and functionally equivalent components may be made without departing from the scope of the invention. Thus, the invention is not considered limited to the particular illustrative embodiments shown in the specification and all such alternate embodiments are intended to be included in the scope of this invention.

Fiber Administration:

Fiber optic interconnection closures are affixed in vertical columns on a wall between a floor and a ceiling. Optical fiber cables pass through holes in the floor or the ceiling of a room, pass through an aperture in a trough system and are directed into closures. Optical fiber cables containing optical fibers that are to be terminated or spliced (i.e., connected) in a closure are broken out of the cable's protective sheath in the closure and directed within the closure for interconnection. Optical fibers are protected against excessive stress throughout their path between individual closures. An optical fiber routing system with which the combination closure of the invention may be used is desribed in detail in cross-referenced related application Ser. No. 09/399,869, entitled "Optical Fiber Bend Limiter For Optical Fiber Routing System". The modular design of the combination closure of the invention allows any number of closures to be easily added to a closure arrangement in an optical fiber network.

Figure 1A:
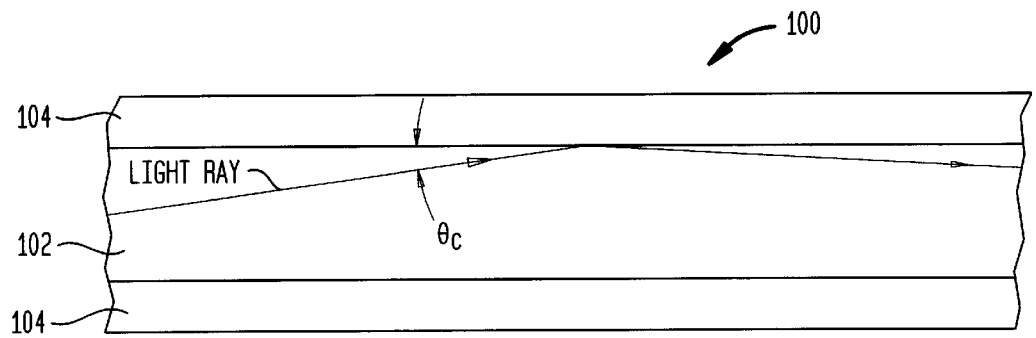
FIG. 1a is a simple ray model of light pulse transmission for a straight optical fiber.
Figure 1B:
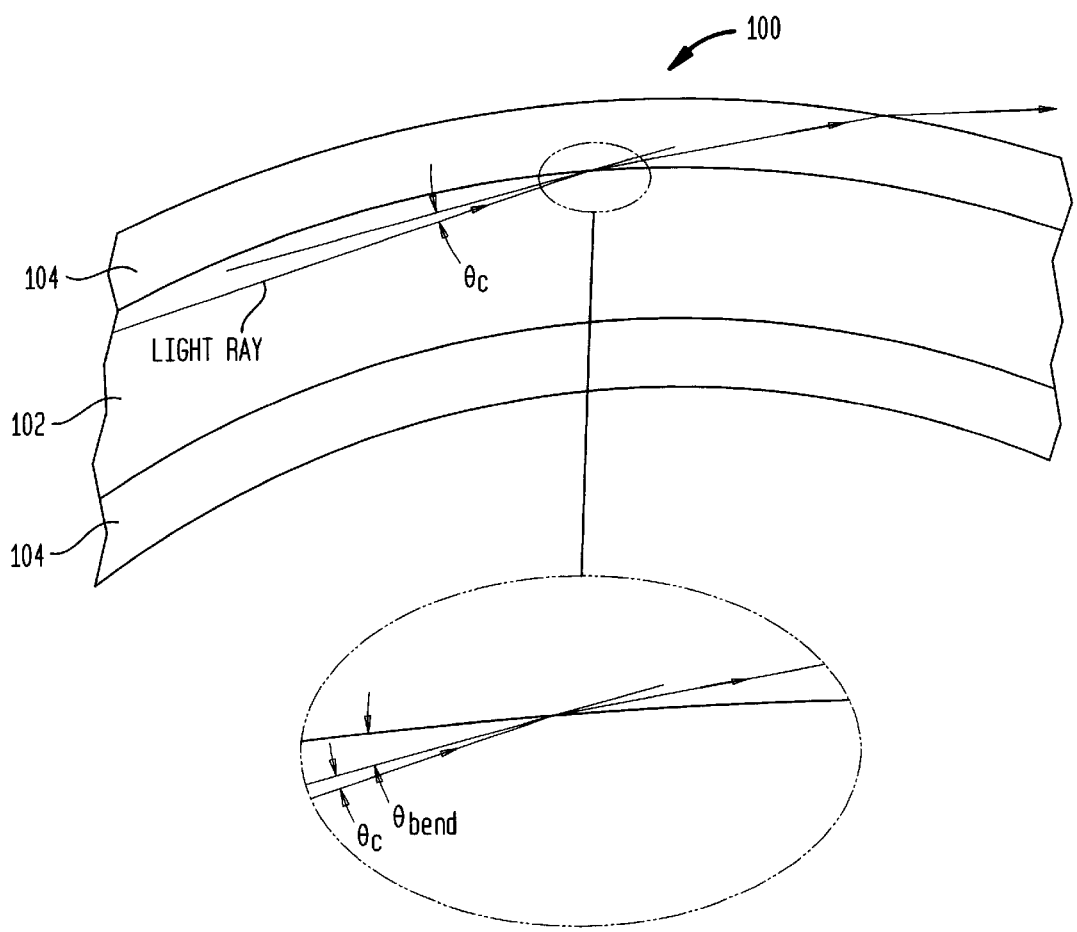
FIG. 1b is a simple ray model of light pulse transmission for a bent optical fiber.
Figure 2:
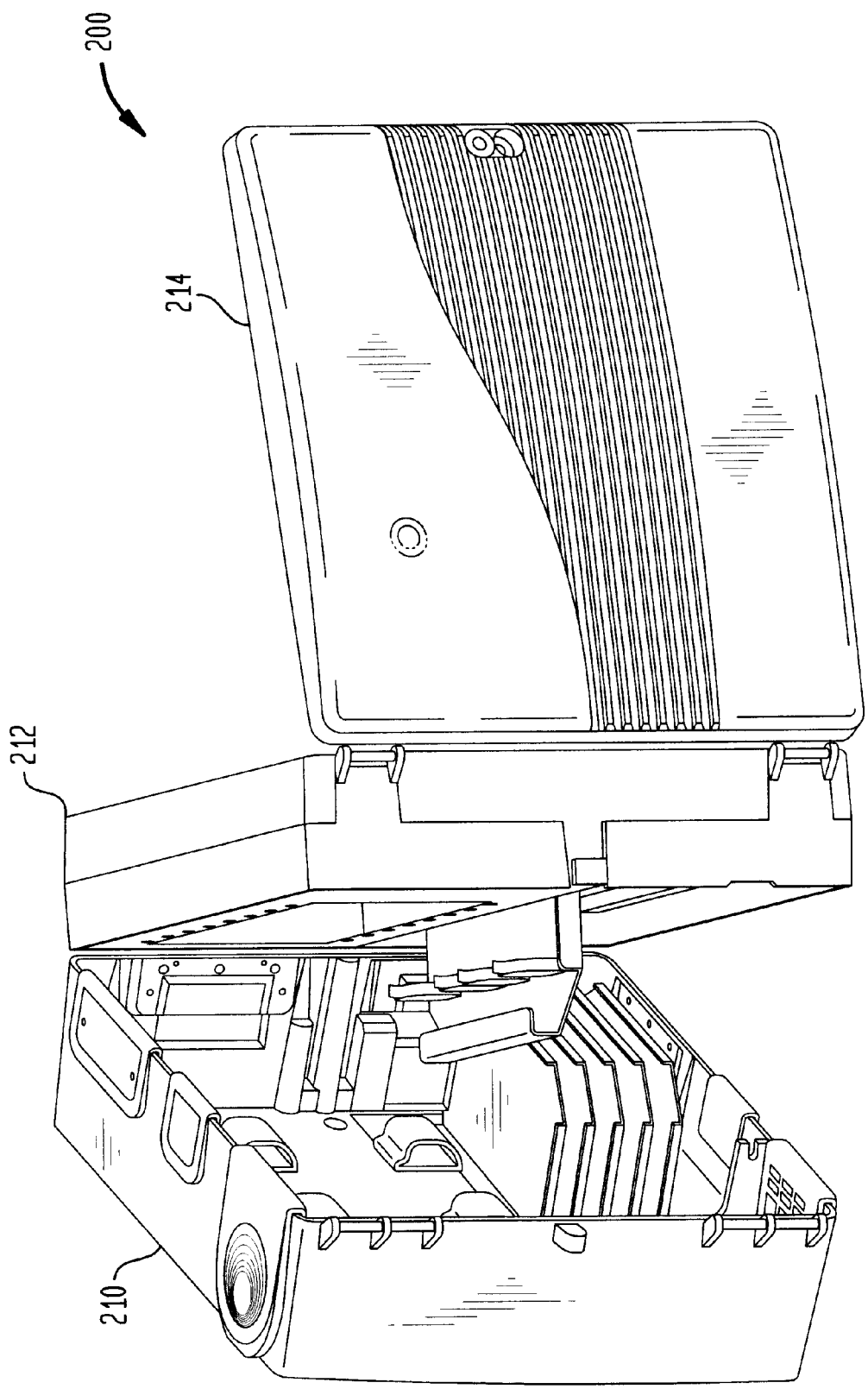
FIG. 2 depicts a fiber optic interconnection closure.

Combination Closure:

Referring to FIG. 2, there is shown a fiber optic interconnection combination closure in accordance with the present invention. The modular closure of the invention allows both splicing and termination of optical fibers in a single enclosure while providing storage for fiber slack. As shown, the combination closure 200 of the invention is comprised of three articulated segments which couple to provided an enclosed space. A base assembly 210 is joined with one end of a chassis 212. The other end of the chassis 212 is joined with a cover plate 214. The interior of the fiber optic interconnection combination closure of the invention provides facilities that maintain the minimum bend radius for routed optical fibers. (Hereinafter, the maintenance of routed fiber in compliance with bend limits is sometimes referred to as "fiber control" or "the controlling of fiber".) At the same time, such facilities do not interfere with the other devices positioned in the closure.

Base Assembly & Splices

Figure 3:
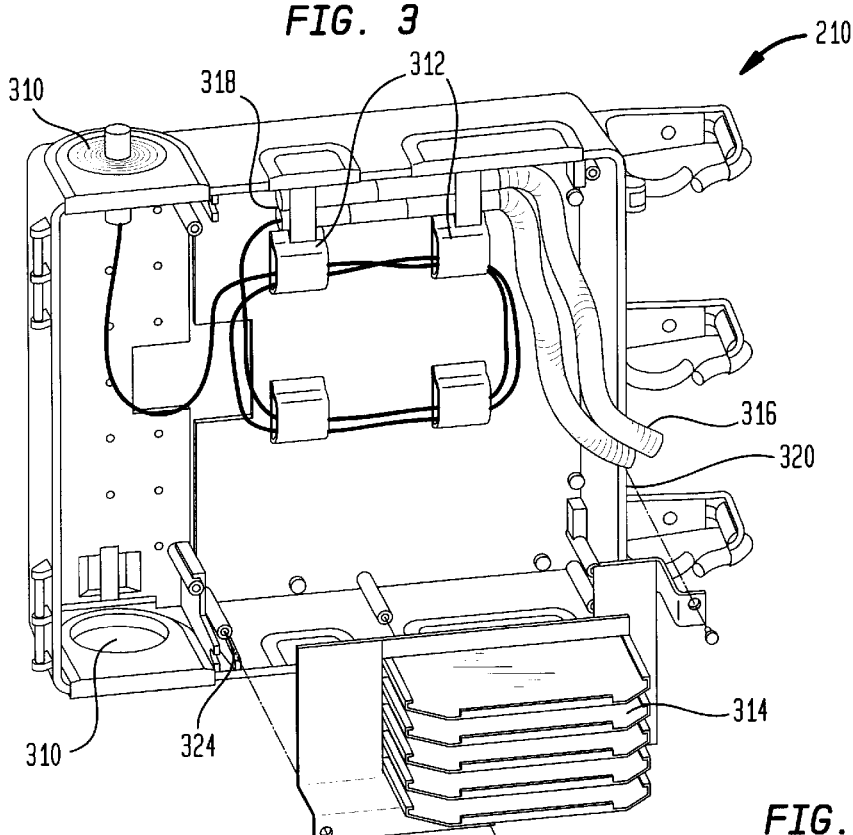
FIG. 3 depicts a base assembly of a fiber optic interconnection combination closure.

The base assembly 210 of the fiber optic interconnection combination closure of the invention is depicted by FIG. 3. The base assembly defines a chamber in which optical fibers are routed in observance of their bend limit to splice organizers for the fashioning of splice connections. At opposite ends of the base assembly 210 are coaxially aligned cable apertures 310 with entry port grommets that may be sized to form graduated openings for optical fiber cables. Optical fibers that are to be connected within a particular closure are broken out of their optical fiber cable in the closure interior. Fiber clips 312 within the closure secure optical fiber to the inside wall of the base assembly 210. The fiber clips are positioned in predetermined locations compatible with the fiber bend limit such that fiber slack may be looped from clip-to-clip without being bent in violation of the minimum bend radius. Fibers may also be directed to the chassis section (not shown) through a loom 316, for instance, a corrugated split tube, secured to the base assembly wall by cable ties 318. The placement of fibers in the loom prevents the snagging or excessive bending of fibers during opening or closing the closure and also assists the transitioning of fibers from the base assembly 210 to the chassis 212 or out of the closure through exits portals 320.

In the illustrated embodiment, the base assembly chamber contains a bracket assembly 314 with mounting holes 322 by which the bracket assembly is secured to mounting posts 324 in the base assembly 210 with self-tapping or sheet-metal screws. Alternative means of securing the bracket assembly to the base assembly will be apparent to those skilled in the art of the invention. For instance, the bracket assembly may be bonded to the base assembly or may be molded integral with the base assembly. The bracket assembly is formed by a vertical plane with multiple horizontal planes spaced to provide open areas between the horizontal planes, i.e., shelves. The shelves are spaced such that a splice organizer may be positioned on each shelf of the bracket assembly 314. Each shelf also has flanges located on edges not connected to the vertical plane which act to hold positioned splice organizers in place. A splice organizer nominally houses fusion or mechanical splices with fibers routed within the organizer in compliance with the fiber's minimum bend radius. Fiber slack stored in fiber clips 312 allow easy movement/access to individual fibers and splice organizers without disturbing other splice organizers and/or fibers. Fiber slack easily may be manipulated and thus an individual splice organizer (i.e., an individual fiber splice) may be accessed during installation or maintenance without disturbing other fiber connections, and while remaining intact and secured inside the closure.

Figure 4:
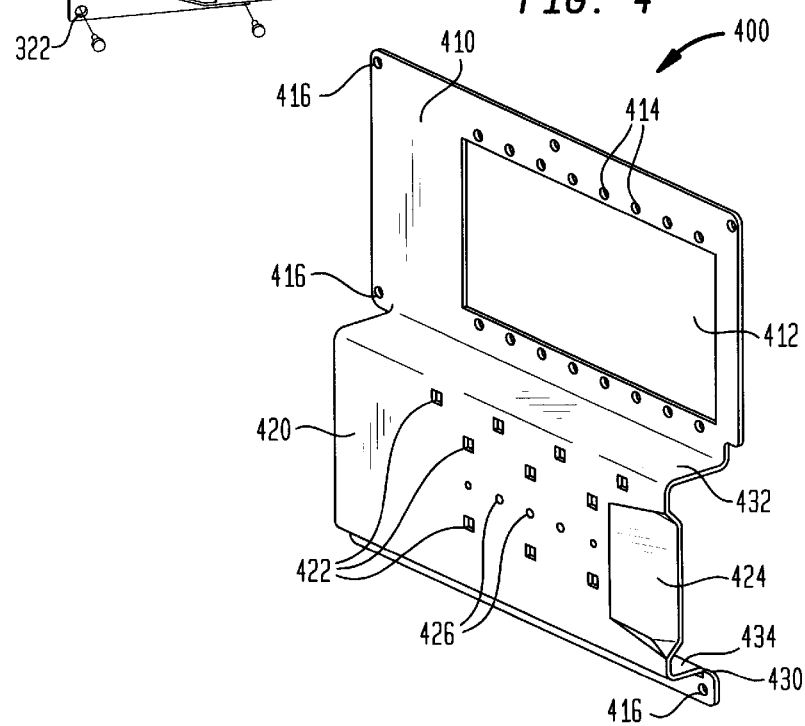
FIG. 4 depicts a front view of a panel in accordance with the invention.

Multi-Plane Panel:

A front view of the multi-plane panel of the invention is shown in FIG. 4. The panel 400 is dimesionally sized to fit the chassis compartment. The panel is defined primarily by two parallel planes. A first plane 410, defining the upper portion of the panel, is used for terminating optical fibers to termination adapters. The first plane 410 has a primary open area 412, preferably rectangular in shape, into which termination adapters (not shown) may be mounted. Adapter mounting holes 414 are provided adjacent to the upper and lower boundaries of the primary open area 412 for securing columns of termination adapters thereby creating a termination adapter array. The first plane is also provided with panel mounting holes 416 for securing the panel to the chassis.

A second plane 420, offset from the first plane, defines the lower of the panel and allows for orderly draping of fibers. In a preferred embodiment, the offset is approximately 2". The second plane has fiber ring mounting holes 422 allowing for the installation of fiber rings and fiber retainers. The fiber ring mounting holes 422 are positioned such that fibers routed through mounted fiber rings and fiber retainers (not shown) are maintained at radii greater than the minimum bend radius. Various alternatives for retaining fibers as would be known to one skilled in the art are contemplated by the invcention. In a preferred embodiment, the fiber rings and fiber retainers have pegs that snap-into the fiber ring mounting holes 422 and allow push-through placement of fibers, eliminating the necessity of threading fibers through openings.

The front of second plane 420 also has a gradual taper 424, such that tapered edge of the panel meets the rear boundary of the exit portals upon proper installation of the panel in the chassis of the closure. The gradual taper is used to assist in transitioning fibers to the exit portals and to thereby avoid sharp bends as the fibers exit the closure, which bending is detrimental to light transmission. Upon exiting the closure at the exit portals, the fibers may be routed to the other closures and/or other optical system equipment. The second plane also has tray mounting holes 426 that permit the attachment of the tray (not shown) of the panel/tray assembly to the rear of the panel (i.e., the side of the panel that is to be installed facing the base assembly of a closure).

The panel also has a mounting flange 430 parallel to the first plane and the second plane. Panel mounting holes 416 in the mounting flange allow the lower portion of the panel to be secured to the closure chassis. All panel mounting holes 416 align with mounting holes in the closure. A unitary panel is formed by connecting the parallel planes and the mounting flange perpendicular extensions. A first extension 432 connects the first plane to the second plane and a second extension 434 connects the second plane to the mounting flange. In a preferred embodiment, the panel is a unitary piece of shaped aluminum alloy on the order of 0.06 inches thick. However, the panel is susceptible to alternative embodiments including a single segment or joined multiple segments of various materials. For instance, a panel may be constructed from a single piece of molded plastic or several pieces of any thin light-weight material that can be shaped and bonded together.

Figure 5:
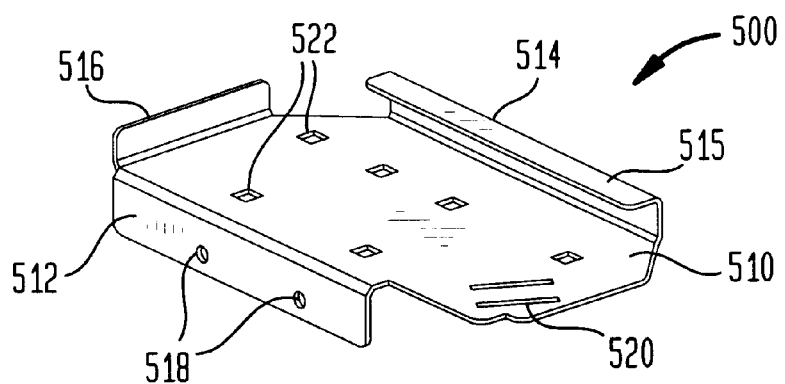
FIG. 5 depicts a tray in accordance with the invention from a perspective above and to the right of the front of the tray.

Tray:

As previously stated, the tray of the invention is attached via tray mounting holes 426 to the rear of the second plane of the panel. The tray both stores fiber slack and maintains bend limits for fibers routed to rear facing adapter ports of the panel-mounting termination adapters. FIG. 5 depicts a tray according to the invention from a perspective above and to the right of the front of the tray. The unitary tray 500 is comprised of a horizontal sheet 510 having a bracket 512, a rear flange 514, and a side flange 516. The bracket, positioned on the front edge of the horizontal sheet, is provided with tray mounting hole 518 for connecting the tray to the panel. The rear edge and a side edge of the horizontal sheet are supplied with flanges 514 & 516 to prevent fibers routed on the tray from spilling into the closure compartment. The rear flange 514 may additionally be provided with a lip 515 to futher secure routed fibers in place on the tray. The othe rside edge of the horizontal sheet lacks a vertical member in order to allow for the introduction of fibers onto the horizontal sheet. At this edgeof the horizontal sheet, loom tie slots 520 are provided for securing a loom to the tray, thereby preventing the loom (the loom providing a channel for fibers routed from the base assembly to the chassis) from snagging during the opening and/or closing of the closure. The horizontal sheet 510 of the tray also contains fiober ring mounting hole 522 into which fiber rings having pegs can be positioned. The fiber rings assist in controlling optical fibers routed from the tray to a termination adapter array mounted in the panel of the combined fiber/tray assembly.

In the preferred embodiment, the loom tie slots are placed at an angle approximately 45° to the flangeless side edge of the sheet and the loom is bound to tray with wire ties threaded through the loom tie slots. Various alternative methods of securing the loom to the loom tie slots (many requiring minimal alteration) will be apparent to those skilled in the art of the invention. For example, the loom could be secured with clips that are placed around the loom and snapped into clip holes. Also, note that the tray maybe formed from a diverse range of materials and in manner similar to that heretofore desribed for the panel.

Figure 6:
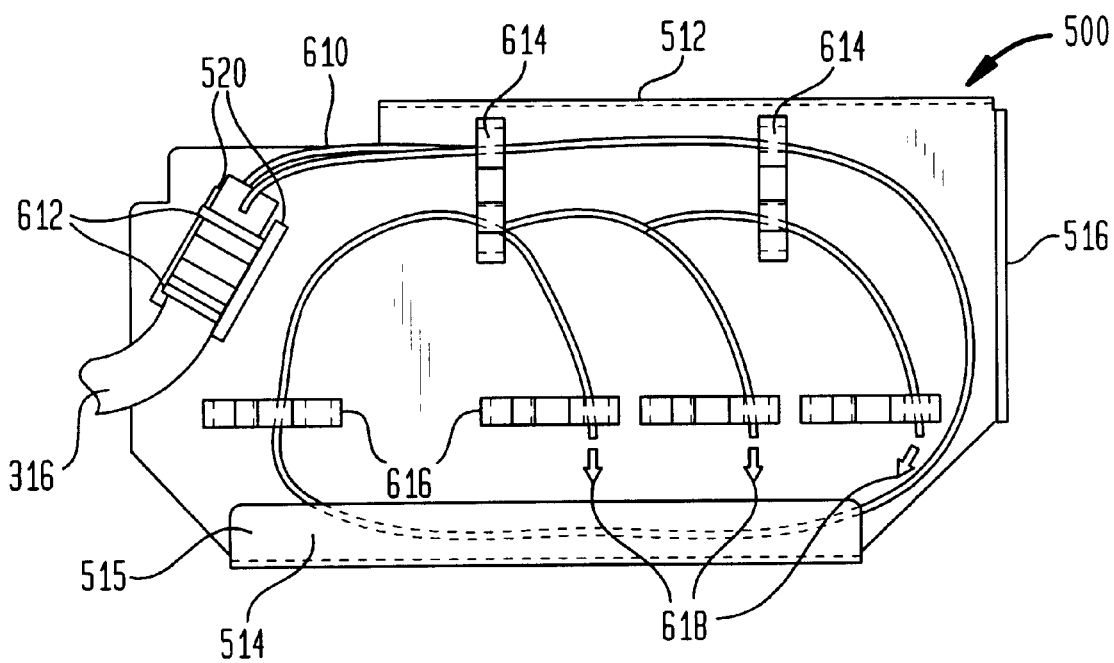
FIG. 6 is an overhead perspective of the tray of the invention with routed optical fiber.

FIG. 6 is an overhead view of the tray 500 of the invention with routed optical fibers. Fibers 610 exiting the loom are first routed through fiber rings 614 installed perpendicular to the front edge of the tray. The fibers are then looped to the rear of the tray with the rear flange 514 and side flange 516 preventing the fibers from spilling into the interior of the closure. The lip 515 on the rear flange 514 further secures fibers in place on the tray. Fibers are next routed along the rear flange 514 to a fiber ring 616, positioned parallel to the rear edge of the tray and near the loom tie holes, and back to the fiber ring perpendicular to the tray front edge. From this position, fibers may be looped around the tray in a similar manner as is necessary to store additional fiber slack, or the fibers may be seperated out of the fiber rings 614 perpendicular to the tray front edge and directed to fiber rings 616 parallel to the tray rear edge. From fiber rings 616, the fibers are directed (arrows 618) To a termination adapter array mounted in the panel of the panel/tray assembly.

Optical fibers are connected end-to-end in a splice organizer, thereby enabling a light pulse to be propagated between the fibers. The splice organizer may be comprised of a base, snap-in inserts, and a snap-in cover. Individual optical fibers are routed into a splice organizer through a rachetched slide and into the splice organizer base. Excess lengths of individual fibers are routed in the interior of the splice organizer and fusion splices are fashioned on the snap-in insert. All fibers and splices within the organizer are protected and held in place by the snap-in cover. All fibers bend within an organizer are maintained at a radius larger than the minimum bend radius. Various alternative embodiments of a splice organizer may be positioned on the shelves of the bracket assembly in a combination closure.

Referring again to FIG. 3, optical fibers in the closure may also be routed within a loom 316 (a corrugated split tube providing a channel for fibers) secured to the base assembly with cable ties 318. The loom prevents fibers from snagging or bending in excess of the bend limit when the closure is accessed, as well as directing fibers between the base assembly 210, the chassis 212 and/or closure exit portals 320. Wire brackets on the exterior of the base assembly form a vertical raceway through which optical fibers directed to other closures and/or optical system equipment may be routed. A wiring access slot in wire bracket enables push-through placement of fibers and eliminates the need to feed the optical fibers through an aperture. Mounting holes 322 in the base assembly allow the closure to be secured to a mounting surface (not shown).

Panel/Tray Assembly

Figure 7:
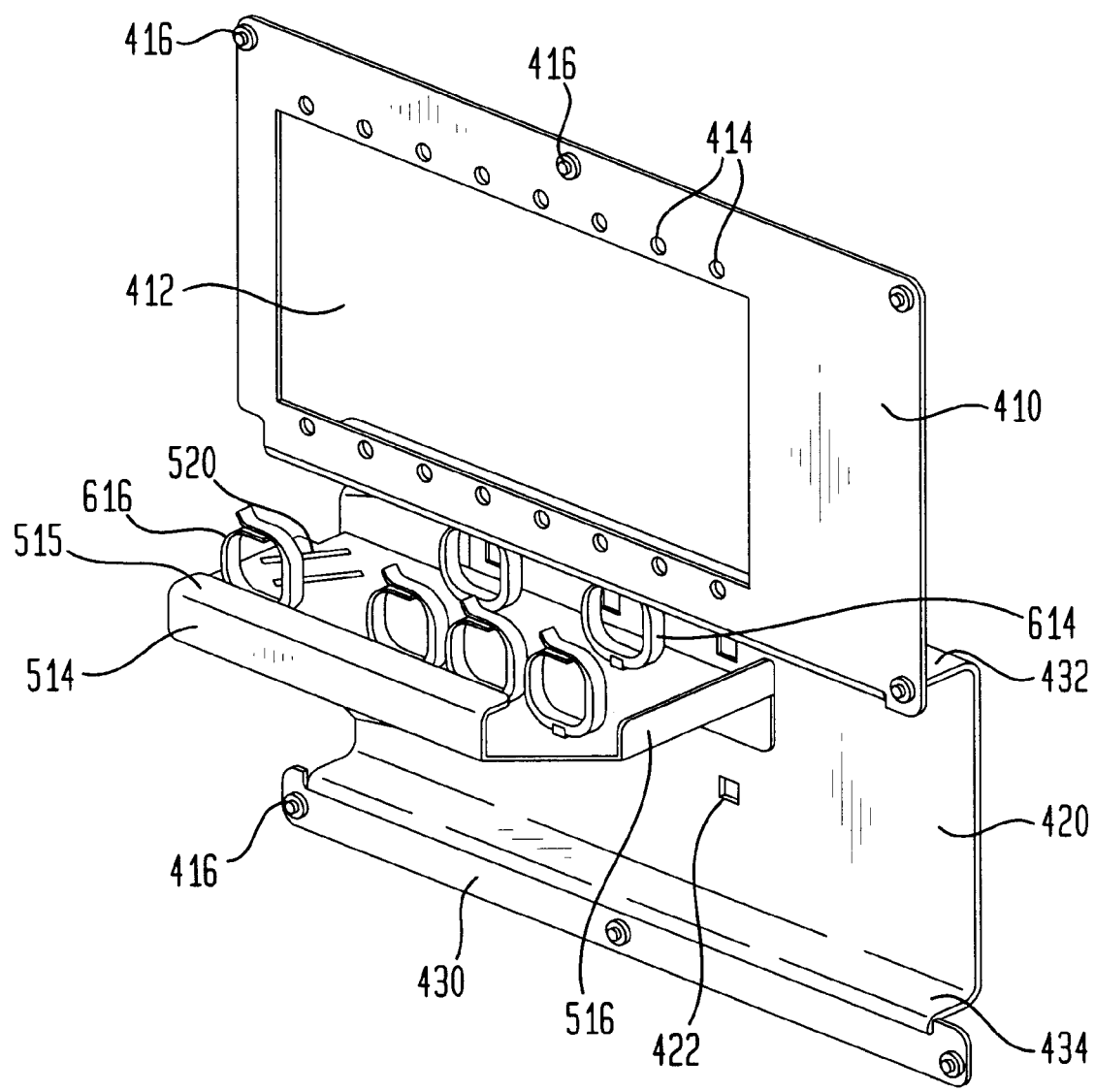
FIG. 7 is a rear view of the panel of the invention with the tray of the invention attached.

FIG. 7 provides a rear view of the panel/tray assembly of the invention -- i.e., the panel 400 with the tray 500 attached. The illustrated view is that which will face a closure's base assembly when the panel/tray assembly is properly installed in a closure. The panel has a first plane 410 with a primary open area 412 into which termination adapters are mounted, and a second plane 420, offset from the first plane, with mounting positions for fiber rings and retainers which maintain the bend limits for fibers routed to/from the first plane. The offset provides spacing necessary to bend routed optical fibers with radii larger than a minimum bend radius and to arrange other optical equipment in a closure. The tray 500 is connected to the second plane of the panel and includes flanges and mounted fiber rings that cooperate to store fiber slack for fibers directed within the closure. The second plane 420 also has fiber ring mounting holes 422 for the installation of fiber rings (not shown) and fiber retainers (not shown) on the front of the panel. Likewise, the panel-mounted fiber rings and fiber retainers cooperate to maintain bend limits for fibers routed between the termination adapter array and the exit portals of the closure.

Figure 8B:
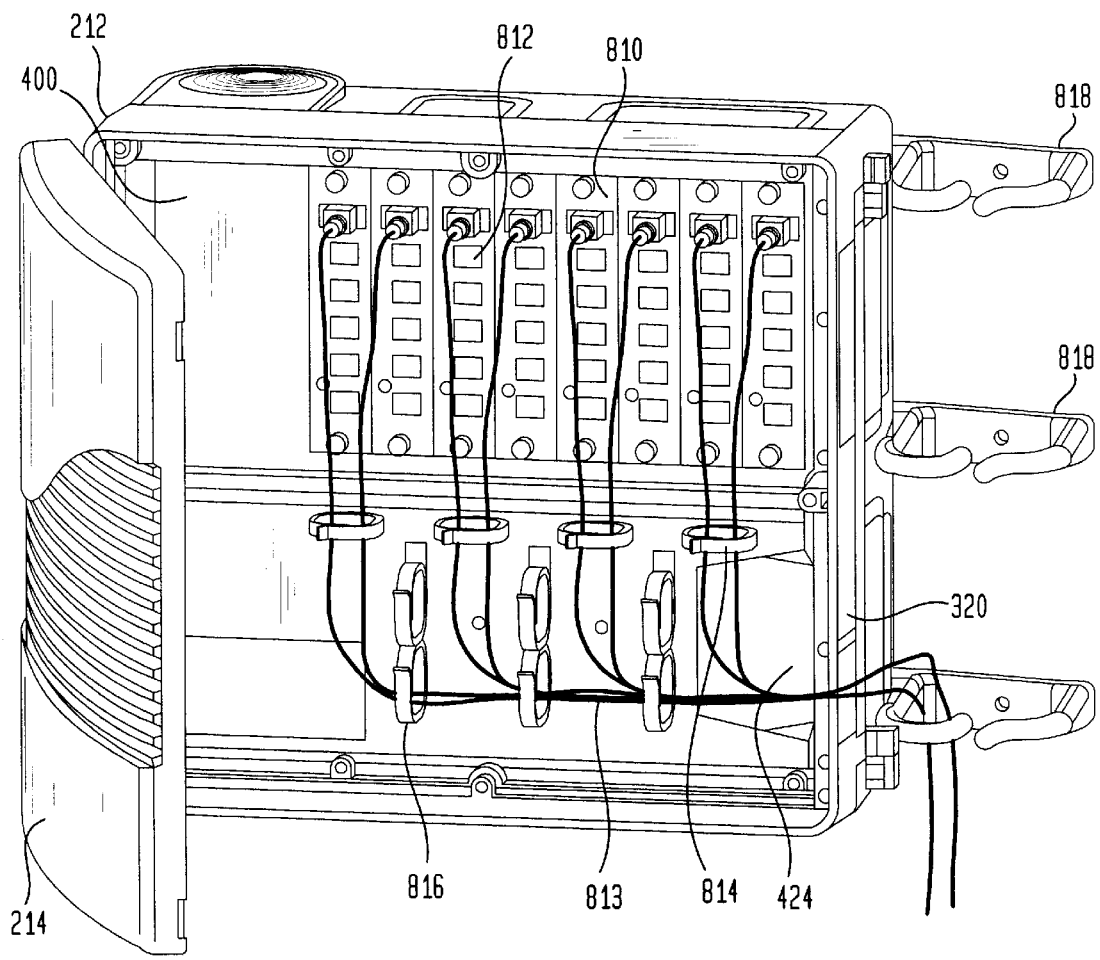
FIG. 8b provides a front perspective of the panel of the invention installed in a chassis segment of a combination closure with optical fibers routed and terminated to a termination array mounted on the panel.

Chassis & Terminations:

FIG. 8a and FIG. 8b provide alternate views of the combination closure of the invention detailing the front of the chassis 212. (This view of the chassis is nominally called the "front", denoting that the illustrated side of the chassis couples to the closure cover plate.) The chassis defines a chamber in which terminations are fashioned and optical fibers routed while the bend radius of the fibers is controlled. The chassis is sectionalized into a front compartment and a back compartment by a two-plane panel 610. The two-plane panel also defines an upper bulkhead in the front compartment of the chassis and a lower bulkhead in the rear compartment of the chassis. The upper portion of the panel 400 has a primary open area into which is mounted a termination adapter array 810 formed from a plurality of termination adapters 812. Termination adapters, for example SC, SC Duplex, ST (multi-mode or single mode), LC Simplex (multi-mode or single mode), or LC Duplex (multi-mode or single mode), may be specified in any particular embodiment of a closure according to individual applications.

Optical fibers are directed to and terminated at termination adapter ports on the termination adapter array. Fiber rings 816 and fiber retainers 814 on the lower portion of the front of the panel 424 are positioned to assist in the maintenance of the minimum bend radius for fibers routed therethrough. In an exemplary embodiment, fiber rings 816 and fiber retainers 814 are fashioned with pegs that allow the rings and retainers to be secured to peg holes in the panel. The fiber rings 816 and fiber retainers 814 are used to organize and protect fibers routed to/from the termination adapter array 810 to exit portals 320 in the chassis, as well as store fiber slack. Optical fibers are transitioned from exit portals 320 into wire brackets connected to the base assembly 210. Each wire bracket is provided with a slot to facilitate push through placement of fibers.

Figure 9A:
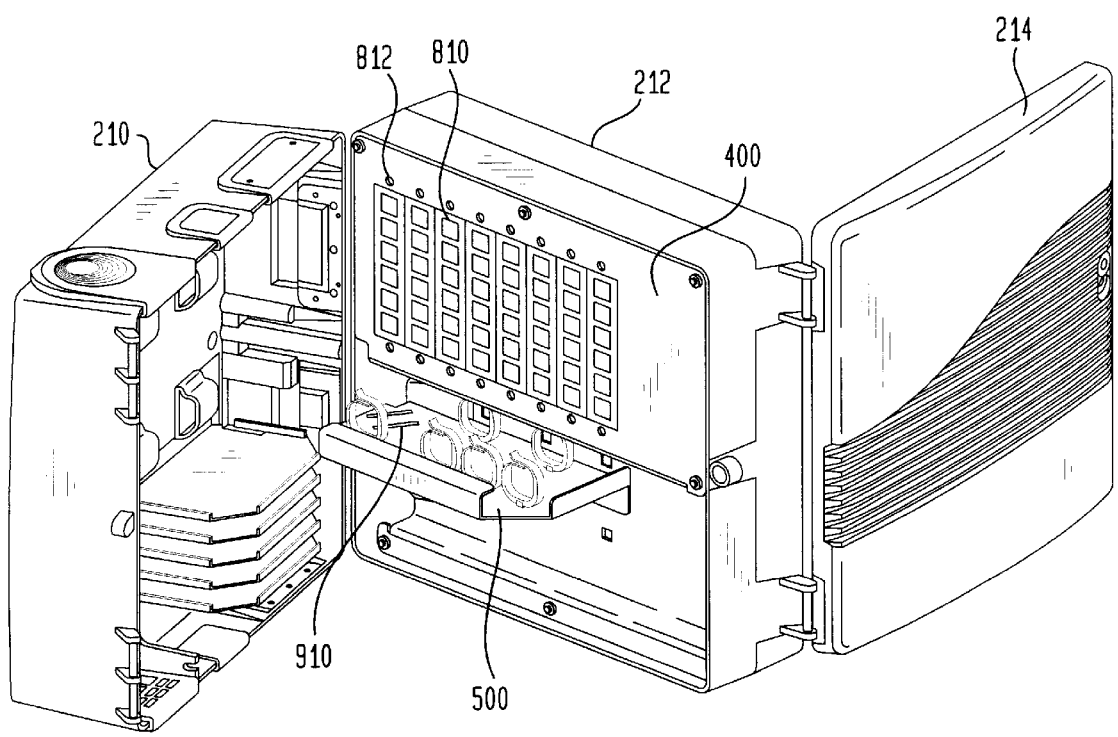
FIG. 9a is a reverse angel of FIG. 8a, providing rear perspective of the panel of the invention installed in a chassis segment of a combination closure.
Figure 9B:
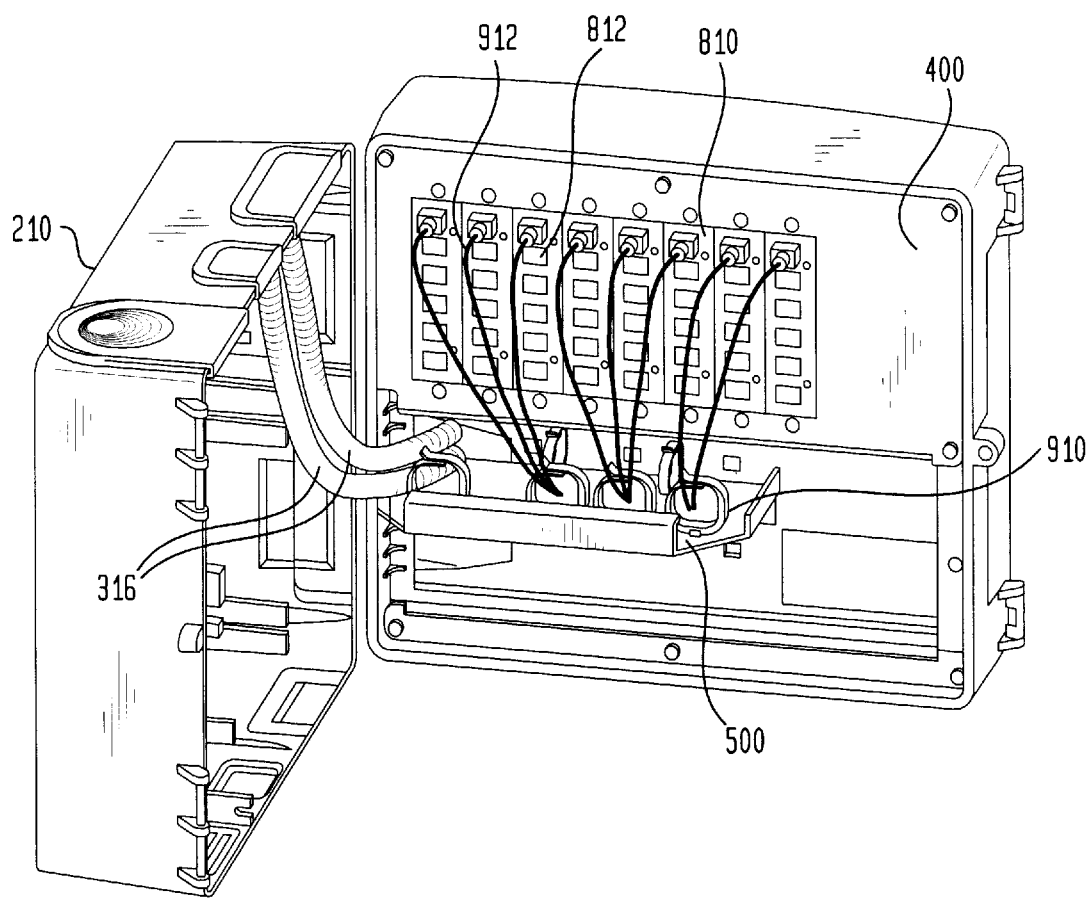
FIG. 9b provides a rear perspective of the panel of the invention installed in a chassis segment of a combination closure with optical fibers routed and terminated to a termination array mounted on the panel.

FIG. 9*a* and FIG. 9*b* provide alternate views of the combination closure of the invention detailing the rear of the chassis 212. (This view of the chassis is nominally called the "rear", denoting that the illustrated side of the chassis couples to the closure base assembly.) A chassis 212 opens from a base assembly 210 to provide rear access to termination adapter array 810 and its constituent termination adapters 812. A tray 500 connected to panel 400 occupies the lower bulkhead and is arranged (as described below) to provide bend limiting for fibers routed to/from a termination adapter array. Such bend limiting must be an integral part of the chassis panel in order to avoid excessive fiber bends while accessing a closure, since fibers are routed to the panel-mounted termination adapter array in the chassis and the chassis rotates open from the base assembly. Fibers may be looped around the tray 500 using fiber rings, which are positioned in cooperation with front and side flanges, such that fibers are controlled as they are routed to the termination array. Fiber slack also may be stored by being routed among fiber rings. In an exemplary embodiment, fiber rings have pegs which secure into peg holes in the tray and all fiber rings and fiber retainers open/close to allow wiring without the need to feed fibers through an aperture.

Fibers may be transitioned from a base assembly 210 to a chassis 212 in a loom 316 and the loom secured to a tray 500 with cable ties in order to prevent snagging or excessive bending during the opening and closing of the chassis. A panel/tray assembly for use in a preferred embodiment of the combination closure of the invention is described in further detail in the cross-referenced related application U.S. Ser. No. 09/401,169, entitled "Panel/Tray For Fiber Optic Interconnection Combination Closure".

In the exemplary embodiments shown in FIGS. 8*a*–9*b*, termination adapter array 810 has eight rows of six termination adapters 812 for a total capacity of forty-eight interconnections between input and output fibers. Input fibers may be terminated on one side of the panel and output fibers on the other. In a preferred embodiment, the termination closure provides for arrangements of forty-eight simplex or duplex adapters resulting in a total nominal termination capacity of forty-eight to ninety-six fibers. Thus, external optical leads may be joined, thereby interconnecting optical network equipment while at the same time protecting the optical fibers from excessive bending violative of the minimum bend radius.

Conclusion:

There has been described and illustrated herein, a fiber optic interconnection combination closure in which optical fiber connections may be fashioned in an enclosure protected from environmental conditions and fiber stress. The combination closure of the invention enables orderly connection of optical fiber splices and terminations in a protected enclosure while controlling fibers and maintaining fiber bend limits. In sectionalized compartments of the closure, splices are fashioned in splice organizers and optical fibers are terminated in termination adapters. Optical fibers are protected from excessive bending on paths to and from splice organizers, termination adapters, and exit portals. Fiber clips, rings, and retainers, positioned in predetermined locations compatible with the fiber's inherent bend limit, organize, strain relieve and collect routed fibers. Slack storage accommodations allow connections to be handled individually during installation and maintenance without disturbing adjacent connections or fibers. The combination closure of the invention protects optical fibers from excessive bending thus avoiding optical signal degradation and/or total signal loss on fibers routed in an optical fiber network.

It is to be understood that the invention is not limited to the illustrated and described forms and embodiments contained herein. It will be apparent to those skilled in the art that various changes using different configurations and functionally equivalent components may be made without departing from the scope of the invention. Thus, the invention is not considered limited to what is shown in the drawings and described in the specification and all such alternate embodiments are intended to be included in the scope of this invention as set forth in the following claims.

What is claimed is:

1. A fiber optic interconnection combination closure for interconnecting optical fiber in an optic fiber network, said closure comprising:
   a housing, said housing comprising a base assembly, a chassis articularly connected to said base assembly, and a cover plate articularly connected to said chassis;
   a chamber disposed in said housing, said chamber having opposed walls in which are defined apertures through which said optical fiber can pass;
   a fiber connection module mounted at a first position within said chamber, wherein said fiber connection module comprises a means for interconnecting said optical fiber; and
   means for maintaining the bend limits of said optical fiber routed in said interconnection closure, said means for maintaining the bend limits of said optical fiber being positioned within said chamber.

2. The fiber optic interconnection combination closure of claim 1, further comprising:
   a bracket assembly mounted in said base assembly for securing said fiber connection module.

3. The fiber optic interconnection combination closure of claim 1 further comprising:
   a multi-plane panel mounted in said chassis for securing said fiber connection module, said multi-plane panel including an upper planar portion and a lower planar portion and defining an upper bulkhead and a lower bulkhead.

4. The fiber optic interconnection combination closure of claim 3 wherein said means for maintaining the bend limits of said optical fiber comprises:
   a fiber ring mounted to said lower planar portion of said multi-plane panel.

5. The fiber optic interconnection combination closure of claim 3 wherein said means for maintaining the bend limits of said optical fiber comprises:
   a fiber retainer mounted to said lower planar portion of said multi-plane panel.

6. The fiber optic interconnection combination closure of claim 3 wherein said means for maintaining the bend limits of said optical fiber comprises:
   a tray mounted to said lower planar portion of said multi-plane panel in said lower bulkhead.

7. The fiber optic interconnection combination closure of claim 1 wherein said fiber connection module is selected from the group comprising a splice organizer and a termination adapter.

8. The fiber optic interconnection combination closure of claim 7 wherein said termination adapter is selected from the group comprising SC, SC Duplex, ST multi-mode, ST single mode, LC Simplex multi-mode, LC Simplex single mode, LC Duplex multi-mode, and LC Duplex single mode termination adapters.

9. The fiber optic interconnection combination closure of claim 1 wherein said means for maintaining the bend limits of said optical fiber further includes:
a peg mountable in a fiber mounting hole.

10. The fiber optic interconnection combination closure of claim 1 wherein said means for maintaining the bend limits of said optical fiber further includes:
a push-through access means operative to accept push-through placement of fiber routed via said means for maintaining the bend limits of said optical fiber.

11. The fiber optic interconnection combination closure of claim 1 wherein said means for maintaining the bend limits of said optical fiber further includes:
a fiber clip attached in said chamber of said housing.

12. The fiber optic interconnection combination closure of claim 1 wherein said means for maintaining the bend limits of said optical fiber is selected from the group comprising a fiber ring and a fiber retainer.

13. The fiber optic interconnection combination closure of claim 1 wherein said means for maintaining the bend limits of said optical fiber is a loom.

14. The fiber optic interconnection combination closure of claim 1 wherein said means for maintaining the bend limits of said optical fiber comprises:
a tray attached in said chamber of said housing, said tray having attached fiber rings.

15. The fiber optic interconnection combination closure of claim 14 wherein said tray further comprises:
a side flange; and
a front flange, said side flange and said front flange cooperating to limit the bend radius of said optical fiber routed on said tray.

16. The fiber optic interconnection combination closure of claim 1 wherein said means for interconnecting said optical fiber can be selectively removed from said closure without affecting other optical modules within said chamber.

17. The fiber optic interconnection combination closure of claim 1 further comprising:
a wire bracket positioned on said housing for routing fibers via a vertical raceway, said wire bracket having a slot.

18. The fiber optic interconnection combination closure of claim 1, wherein said fiber connection module has multiple output ports and further includes a termination adapter array disposed within said closure, wherein said termination adapter array is optically coupled to said optical fiber.

19. The fiber optic interconnection combination closure of claim 18, wherein each of said output ports of said fiber connection module is coupled to a separate termination adapter on said termination adapter array with an optical lead.

20. A fiber optic interconnection combination closure for directing optical fibers to splice and termination positions while maintaining fiber bend limits, said closure comprising:

a housing, said housing comprising a base assembly, a chassis articulately connected to said base assembly and a cover plate articulately connected to said chassis, said housing defining a chamber and having opposed walls having apertures through which optical fiber can pass;
a structure having mounting positions within said chamber;
a fiber connection module at a first mounting position on said structure;
a fiber directing means mounted on said structure and within said chamber, said fiber directing means operative to direct said optical fiber to said fiber connection module while bending said optic fiber in radii no smaller than a predetermined minimum bend radius; and
a tray, said tray having attached fiber slack storage means.

21. The fiber optic interconnection combination closure of claim 20 wherein said fiber connection module is selected from the group comprising a splice organizer and a termination adapter.

22. The fiber optic interconnection combination closure of claim 20 wherein said fiber connection module can be selectively removed from said structure without affecting the position of said optical fiber within said chamber.

23. The fiber optic interconnection combination closure of claim 20 wherein said fiber directing means includes:
a peg mountable in a fiber mounting hole on said structure and within said chamber.

24. The fiber optic interconnection combination closure of claim 20 wherein said fiber directing means further includes:
a push-through access means operative to accept push-through placement of fiber routed via a means for maintaining the bend limits of said optical fiber.

25. The method according to claim 24, wherein said fiber connection module can be selectively removed from said chamber without affecting the position of other fiber connection modules within said chamber.

26. The fiber optic interconnection combination closure of claim 20 wherein said fiber directing means is selected from the group comprising a fiber clip, a fiber ring and a fiber retainer.

27. A method of manufacturing a fiber optic interconnection combination closure for directing and connecting optical fiber in an optical fiber network while maintaining optical fiber bend limits for said fiber, said method comprising the steps of:
providing a housing having a base assembly, a chassis articulately connected to said base assembly and a cover plate articulately connected to said chassis, said housing defining a chamber;
providing a structure having mounting positions within said chamber;
mounting a fiber connection module at a first position on said structure within said housing;
mounting a fiber directing means on said structure and within said chamber, said fiber directing means operative to direct said optical fiber to said fiber connection module while bending said optical fiber in radii no smaller than a predetermined minimum bend radius.

* * * * *